United States Patent
Beyeler et al.

(10) Patent No.: US 11,435,378 B2
(45) Date of Patent: Sep. 6, 2022

(54) MEMS-BASED NANOINDENTATION FORCE SENSOR WITH ELECTRO-THERMAL TIP HEATING

(71) Applicant: FEMTO TOOLS AG, Buchs (CH)

(72) Inventors: Felix Beyeler, Ruemlang (CH); Simon Muntwyler, Oetwil an der Limmat (CH); David Beyeler, Daellikon (CH)

(73) Assignee: Femto Tools AG, Buchs (CH)

( * ) Notice: Subject to any disclaimer, the term of this patent is extended or adjusted under 35 U.S.C. 154(b) by 326 days.

(21) Appl. No.: 16/735,748

(22) Filed: Jan. 7, 2020

(65) Prior Publication Data
US 2020/0249254 A1    Aug. 6, 2020

(30) Foreign Application Priority Data

Feb. 4, 2019  (EP) .................................... 19155377

(51) Int. Cl.
*G01N 1/14*  (2006.01)
*G01L 1/26*  (2006.01)
*G01Q 20/04*  (2010.01)
*G01Q 60/36*  (2010.01)
*G01N 3/42*  (2006.01)

(52) U.S. Cl.
CPC ............ *G01Q 60/366* (2013.01); *G01N 3/42* (2013.01); *G01N 2203/003* (2013.01); *G01N 2203/0286* (2013.01); *G01N 2203/0617* (2013.01)

(58) Field of Classification Search
CPC combination set(s) only.
See application file for complete search history.

(56) References Cited

U.S. PATENT DOCUMENTS

| | | | |
|---|---|---|---|
| 7,654,159 B2 | 2/2010 | Enoksson et al. | |
| 7,685,868 B2 | 3/2010 | Woirgard et al. | |
| 8,161,803 B2 | 4/2012 | Oh et al. | |
| 9,335,240 B2 * | 5/2016 | Oh ........................ | G01Q 60/366 |
| 9,535,086 B2 | 1/2017 | Beyeler et al. | |
| 2007/0180924 A1 | 8/2007 | Warren et al. | |
| 2011/0265559 A1 * | 11/2011 | Oh ........................ | B82Y 35/00 |
| | | | 73/81 |
| 2014/0326707 A1 | 11/2014 | Schmitz et al. | |

(Continued)

OTHER PUBLICATIONS

J.M. Wheeler et al., "High temperature nanoindentation: The state of the art and future challenges" Current Opinion in Solid State and Materials Science 19 (2015) pp. 354-366, Published Feb. 19, 2015.

(Continued)

*Primary Examiner* — Brandi N Hopkins
(74) *Attorney, Agent, or Firm* — Laurence A. Greenberg; Werner H. Stemer; Ralph E. Locher (57) ABSTRACT

A MEMS microforce sensor for high temperature nanoindentation is used for determining a mechanical property of a sample by sensing a deflection and measuring a force. The MEMS microforce sensor includes at least a cold movable body, a heatable movable body, a heating resistor and capacitor electrodes. The cold movable body and the heatable movable body are mechanically connected by at least one bridge and the capacitor electrodes measure a force applied on the sample by sensing the deflection of the cold movable body relative to the outer frame by a change of electrical capacitance.

11 Claims, 5 Drawing Sheets

(56) References Cited

U.S. PATENT DOCUMENTS

2015/0033835 A1 2/2015 Asif et al.
2015/0369839 A1* 12/2015 Beyeler ............... G01Q 60/366
850/5

OTHER PUBLICATIONS

A.V. Desai er al., "A novel MEMS nano-tribometer for dynamic testing in-situ in SEM and TEM", Tribology Letters, vol. 18, No. 1, Jan. 2005, pp. 13-19.
Alexandra Nafari et al., "A micromachined nanoindentation force sensor", Sensors and Actuators A 123-124 (2005), pp. 44-49, Available online Jun. 8, 2005.
Yu Sun et al., "A bulk microfabricated multi-axis capacitive cellular force sensor using transverse comb drives", Journal of Micromechanics and Microengineering 12 (2002) pp. 832-840, Published Oct. 3, 2002.

* cited by examiner

MEMS-BASED NANOINDENTATION FORCE SENSOR WITH ELECTRO-THERMAL TIP HEATING

CROSS-REFERENCE TO RELATED APPLICATION

This application claims the priority, under 35 U.S.C. § 119, of European Patent Application EP 19 155 377, filed Feb. 4, 2019; the prior application is herewith incorporated by reference in its entirety.

BACKGROUND OF THE INVENTION

Field of the Invention

The present invention relates to a MEMS microforce sensor for determining a mechanical property of a sample by sensing a deflection and measuring a force.

Nanoindentation is a method for measuring mechanical properties across the surface of a material. In a nanoindentation test, a hard tip (usually a diamond tip) is pressed into a sample having mechanical properties which are unknown. Both the load applied with the sensor tip and the displacement of the sensor tip are measured. Mechanical properties such as the Young's Modulus or the hardness are obtained from the resulting force-displacement data.

At elevated temperatures the mechanical properties of a material may differ significantly from those at room temperature. That makes high temperature nanoindentation relevant to understand materials behavior at service temperatures and conditions in industrial applications. Scientifically, variable temperature nanoindentation is interesting, because the small scales involved allow much tighter control and/or selection of microstructural features of interest which are interrogated by the technique. That allows the kinetic aspects of fundamental materials physics to be investigated in new ways and in materials where investigation using conventional methods was not feasible, according to Reference 1.

Figure 2:
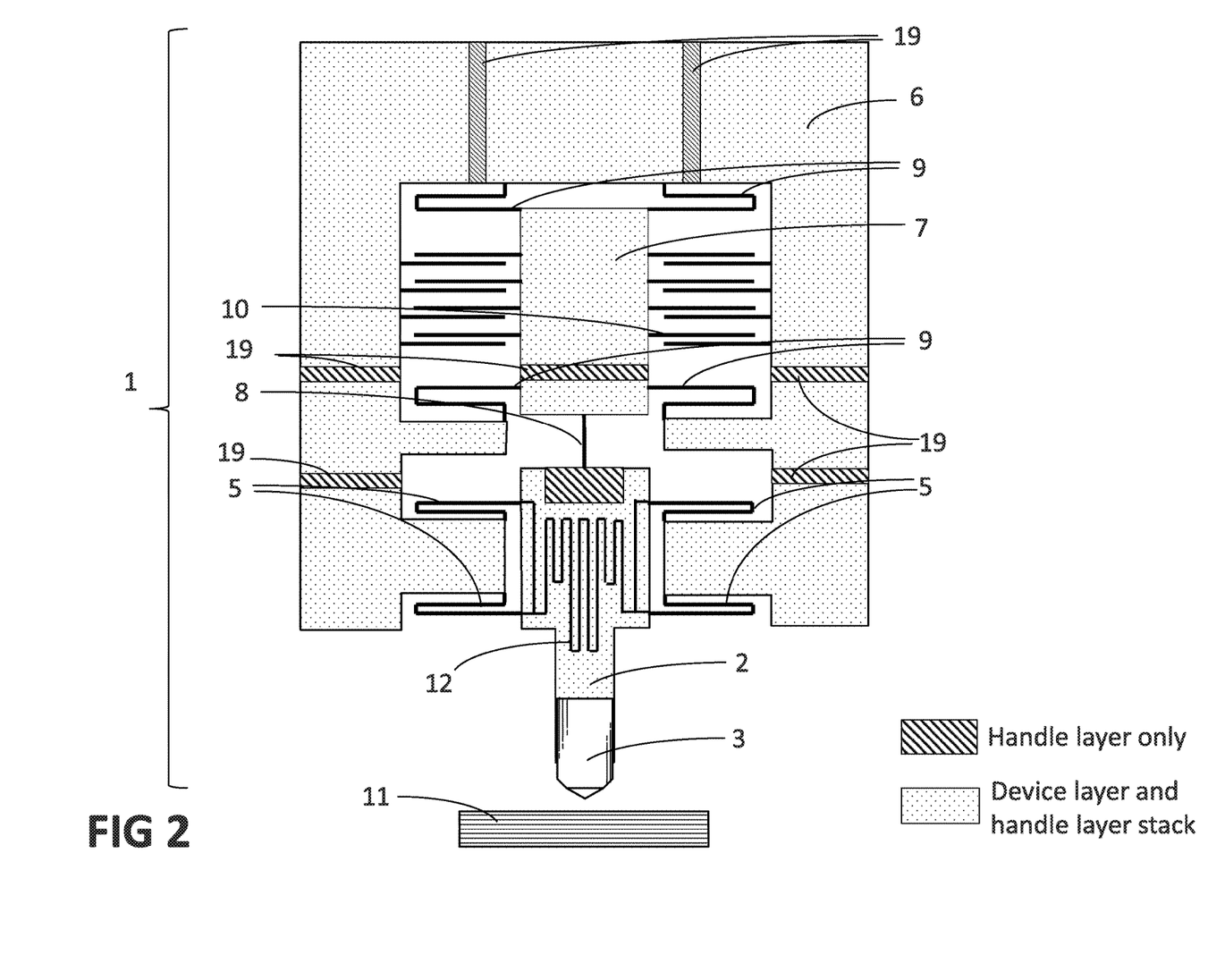
FIG. 2 is a vertical-sectional view of the MEMS microforce sensor showing electrical insulation using trenches.

When performing a nanoindentation on a sample 11 at elevated temperature, it is a key feature that both the sample 11 and the indenter tip 3 can be heated and that they are at the same (elevated) temperature, according to Reference 1 and FIG. 2. The reason is that a temperature difference between the indenter tip and the sample creates unwanted thermal drift at different indentation depths. That results in inaccurate data.

One key component of every nanoindentation system is a high-resolution force sensor. Due to the ability to measure small forces with an extremely high resolution, several MEMS microforce sensors 1 have been proposed for nanoindentation and mechanical testing, according to References 2-10. However, none of those MEMS microforce sensors is constructed for high temperature nanoindentation which requires the heating of the indenter tip 3 to an elevated temperature. Heatable atomic force microscope (AFM) tips have been proposed for variable temperature characterization. However, for nanoindentation they have the disadvantage of a non-symmetrical load application (cantilever bending) and usually a limited force range.

Besides the need for high temperature indentation, there is also a trend towards the testing of even smaller structures and thinner films. That so called "shallow indentation" requires a nanoindentation force sensor with a high force resolution, typically lying in the sub-millinewton or sub-micronewton range. Furthermore, for testing the performance of a material under a cyclic load, a high frequency nanoindentation force sensor with a short response time and high natural frequency is desirable. MEMS (micro electromechanical system) technology enables the configuration and manufacturing of a nanoindentation microforce sensor combining the three requirements described above:
  suitability for high temperature nanoindentation,
  suitability for shallow nanoindentation (high force resolution), and
  suitability for high frequency nanoindentation (high natural frequency).

SUMMARY OF THE INVENTION

It is accordingly an object of the invention to provide a MEMS-based nanoindentation force sensor with electro-thermal tip heating for high temperature nanoindentation, which overcomes the hereinafore-mentioned disadvantages of the heretofore-known sensors of this general type.

With the foregoing and other objects in view there is provided, in accordance with the invention, a MEMS microforce sensor for determining a mechanical property of a sample by sensing a deflection and measuring a force, the sensor comprising:
  an outer frame,
  a cold movable body,
  a heatable movable body,
  a bridge,
  capacitor electrodes, and
  a heating resistor,
wherein:
  the heating resistor is connected to the heatable movable body, the cold movable body is connected to the outer frame by a series of flexures,
  the heatable movable body is connected to the outer frame by a series of heat sink flexures,
  the cold movable body and the heatable movable body are mechanically connected by at least one bridge, and
  capacitor electrodes measure a force applied on the sample by sensing the deflection of the cold movable body relative to the outer frame by a change of electrical capacitance.

This MEMS-based nanoindentation force sensor outperforms systems that are not based on MEMS technology due to the higher force resolution, lower space requirements, faster heating times and most importantly the highly parallel, low-cost manufacturing on a wafer level.

Other features which are considered as characteristic for the invention are set forth in the appended claims.

Although the invention is illustrated and described herein as embodied in a MEMS-based nanoindentation force sensor with electro-thermal tip heating, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments of the working principle of the invention when read in connection with the accompanying drawings.

DETAILED DESCRIPTION OF THE INVENTION

Figure 1:
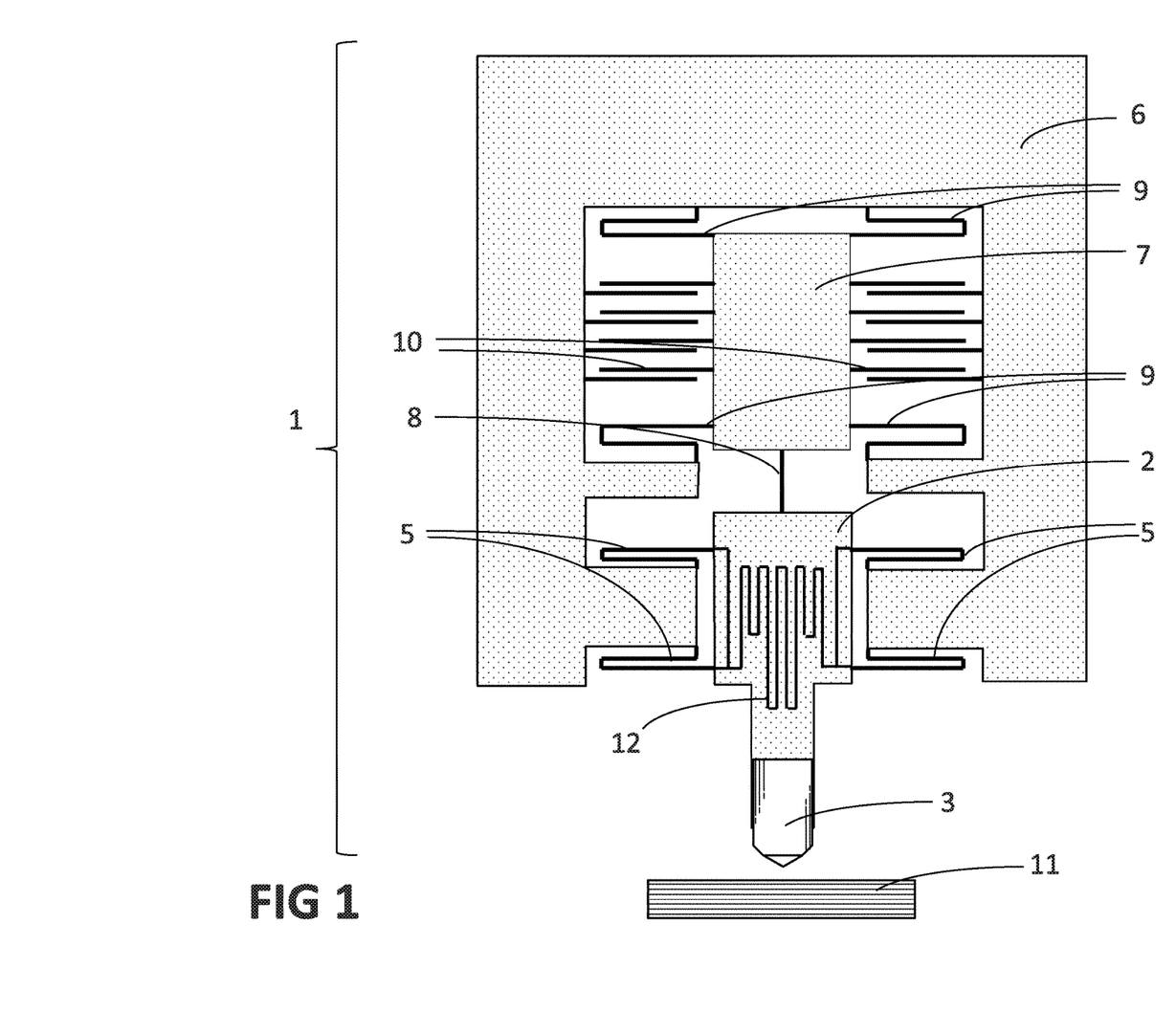
FIG. 1 is a simplified, diagrammatic, vertical-sectional view of a MEMS microforce sensor.

Referring now to the figures of the drawings in detail and first, particularly, to FIG. 1 thereof, there is seen a MEMS microforce sensor 1 having an outer frame 6, a cold movable body 7 and a heatable movable body 2. The cold movable body 7 is suspended by a series of flexures 9. The heated movable body 2 is suspended by a series of heat sink flexures 5. The cold movable body 7 and a heatable movable body 2 are mechanically connected by one or multiple mechanical bridges 8. A series of capacitor electrodes 10 are connected to the outer frame 6 and the cold movable body 7 forming a transverse comb drive for capacitive force sensing as described in Reference 5. The components 2, 5, 6, 7, 8, 9, 10 are monolithically fabricated using a silicon-on-insulator (SOI) MEMS manufacturing process which is detailed in Reference 5. An indenter tip 3 is glued on the heatable movable body 2 using high temperature glue.

In order to perform the nanoindentation test, the MEMS microforce sensor 1 is mounted on a nanopositioning stage which presses the indenter tip 3 of the MEMS microforce sensor 1 into a sample 11. The indenter tip 3 transfers a force F occurring during the nanoindentation into the heated movable body 2. Additionally, the force F is transferred through the bridge 8 into the cold movable body 7. A vertical deflection z of the heatable movable body 2, the bridge 8 and the cold movable body 7 is generated. The deflection z depends on the magnitude of the force F as well as the stiffness $k_f$ of the flexures 9 and the stiffness $k_r$ of the heat sink flexures 5:

$$z = F/(k_f + k_h).$$

For a series of four folded flexures 9 as shown in FIG. 1 the stiffness $k_f$ of the flexures 9 is given by:

$$k_f = 2Et(w_f^3/l_f^3),$$

wherein E is the Young's Modulus of silicon, t the device layer thickness of the SOI wafer, $w_f$ is the width of the flexures 9 and $l_f$ is the length of the flexures 9.

For a series of four heat sink flexures 5 as shown in FIG. 1 the stiffness $k_h$ of the heat sink flexures 5 is given by:

$$k_h = 2Et(w_h^3/l_h^3),$$

wherein $w_h$ is the width of the heat sink flexures 5 and $l_h$ is the length of the heat sink flexures 5.

It is noted that a different number and different geometry can be provided for the flexures 9 and the heat sink flexures 5.

The mechanical deformation of the heatable movable body 2 and the cold movable body 7 can be neglected. Also, the deformation of the bridge 8 can be neglected in the vertical direction. Therefore, from a mechanical point of view, the indenter tip 3, the heatable movable body 2, the mechanical bridge 8 and the cold movable body 7 can be seen as one single object that is deflected relative to the outer frame 6 when a force is applied to the indenter tip 3. The flexures 9 and the heat sink flexures 5 are constructed in such a way that they are stiff perpendicular to the vertical direction. This is provided for making sure that unwanted off-axis forces are not measured.

The vertical deflection z is measured as a change of electrical capacitance by the capacitor electrodes 10. The capacitor electrodes 10 are disposed in such a way that they create a differential transverse comb drive with a capacitance $C_1$ and $C_2$ as described in Reference 5. Using this configuration in combination with capacitive interface electronics 16, a sensor output signal S can be approximated as proportional to $C_1-C_2$ which is a measure for the vertical deflection z and the nanoindentation force F.

Figure 3:
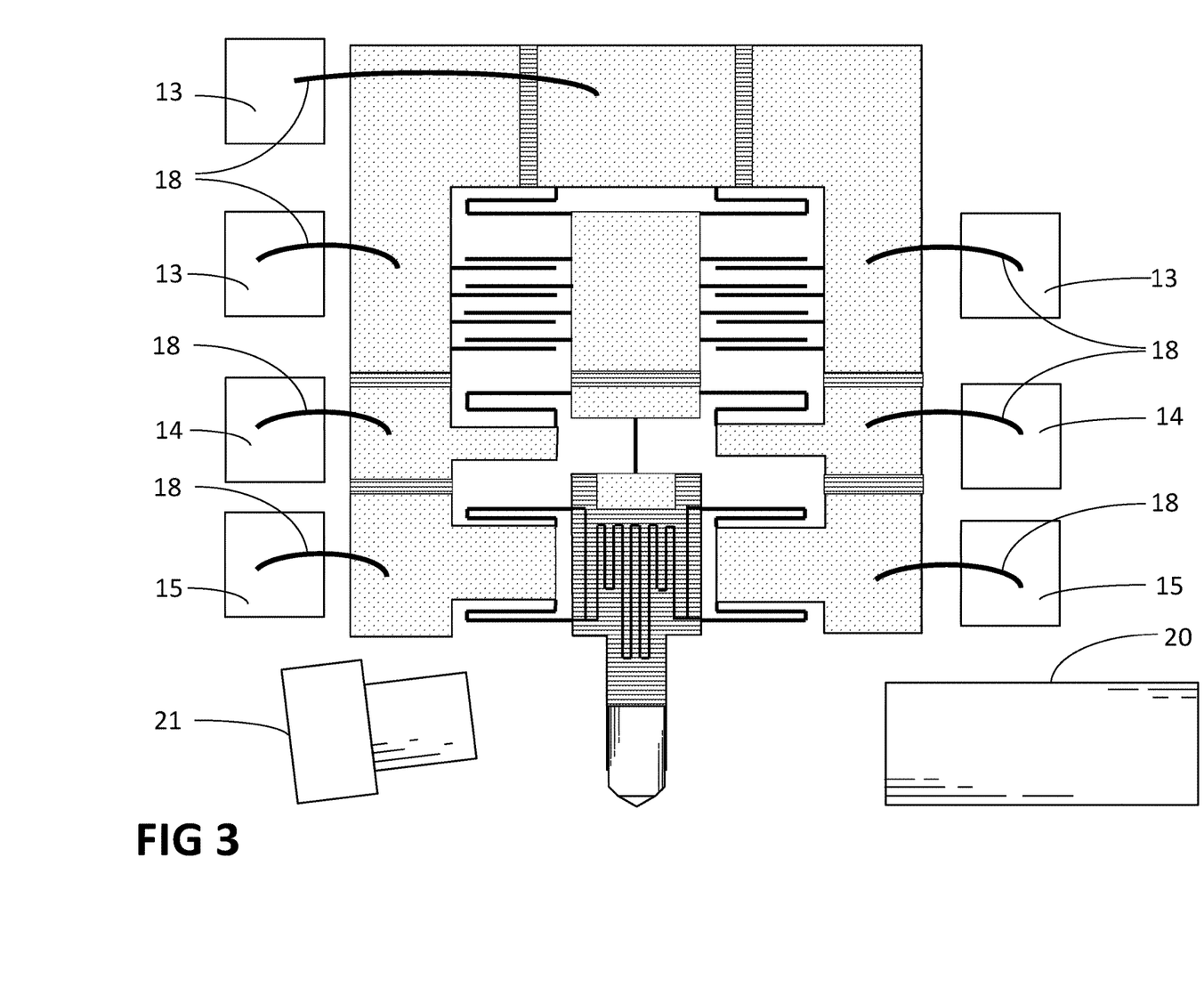
FIG. 3 is a vertical-sectional view of the MEMS microforce sensor showing wire bonds and bond pads.
Figure 4:
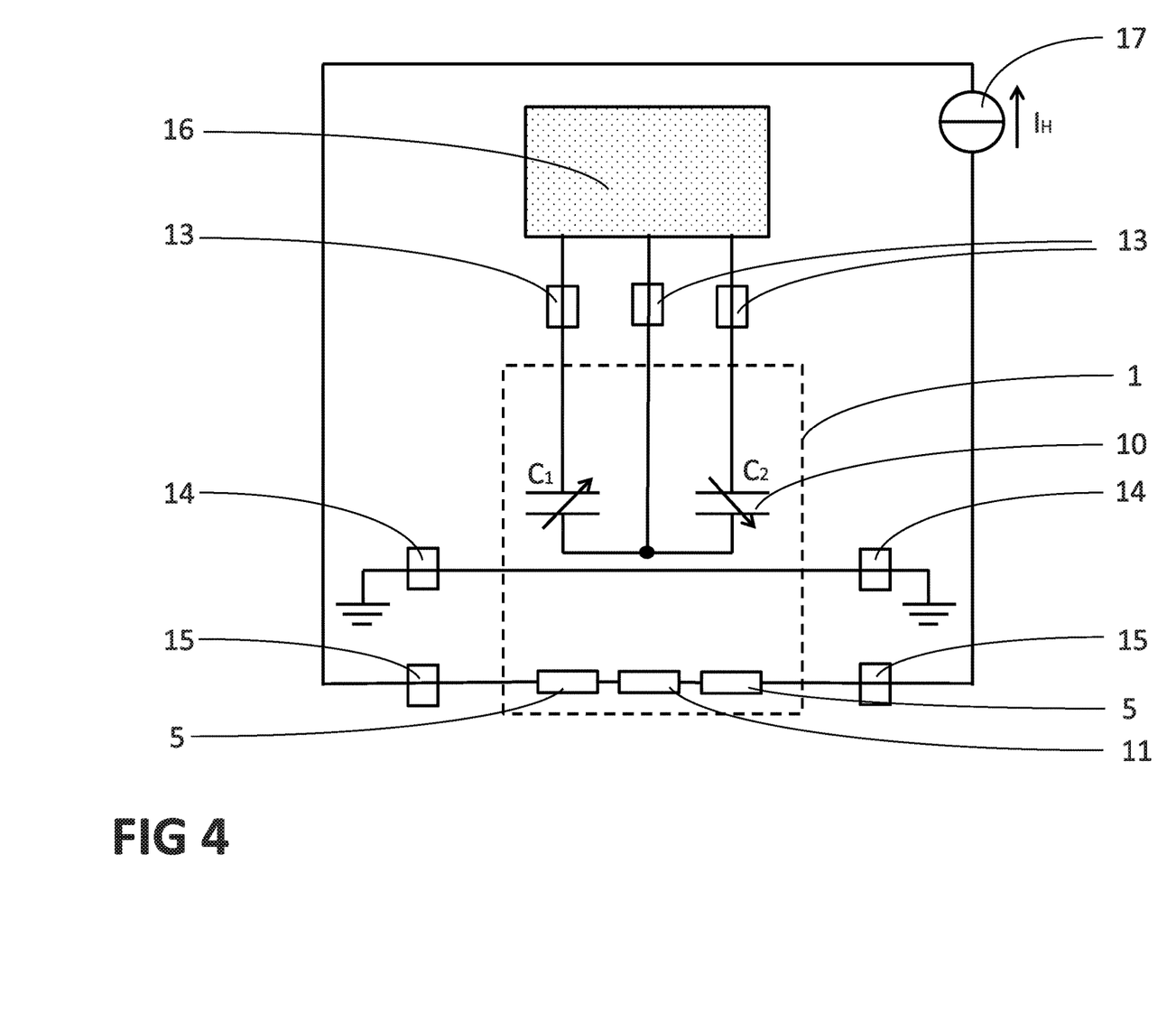
FIG. 4 is an electrical schematic diagram of the MEMS microforce sensor.

In order to create an electrical insulation for the differential transverse comb drive, trenches 19 are etched into the device layer of the SOI wafer. FIG. 2 illustrates in the MEMS microforce sensor 1 how the individual sections are separated from each other. This principle and the manufacturing process are described in more detail in Reference 5. In order to connect the capacitor electrodes 10 to the capacitive interface electronics 16, wire-bonds 18 are made to sensor pads 13 shown in FIG. 3. FIG. 4 additionally shows a schematic electrical view of the MEMS microforce sensor 1 and the interface thereof.

In order to heat the indenter tip 3, the heated heatable body 2 is heated up by passing a current/through a heating resistor 12 that is located on the heatable movable body 2. The heating resistor 12 is either directly etched into the device layer of the SOI wafer, or manufactured by depositing an electrically conductive material such as a metal or polysilicon onto the heatable movable body 2. The heating resistor 12 is electrically contacted through the heat sink flexures 5. Then, the heat sink flexures 5 are contacted by wire bonds 18 to heater pads 15 on the substrate. Then, an external current source 17 is used to pass a current I through the heat sink flexures 5 and the heating resistor 12. The heat power P is given by:

$$P = I^2(R_{hr} + R_{hsf}),$$

wherein $R_{hr}$ is the electrical resistance of the heating resistor 12 and $R_{hsf}$ is the total electrical resistance of the heat sink flexures 5. Since heating is primarily wanted close to the indenter tip 3, the heating resistor 12 is constructed in such a way that $R_{hr} > R_{hsf}$. The electrical resistance $R_{hr}$ can be chosen by the geometry of the heating resistor 12:

$$R_{hf} = \rho_{hr} l_{hr}/(w_{hr} t_{hr}),$$

wherein $\rho_{hr}$ is the electrical conductivity of the material of the heating resistor 12, $l_{hr}$ is the length of the heating resistor 12, $w_{hr}$ is the width of the heating resistor 12 and $t_{hr}$ is the layer thickness of the heating resistor 12. If the heating resistor 12 is either directly etched into the device layer of the SOI wafer, $\rho_{hr}$ is the conductivity of silicon (depending on the doping level of the silicon) and $t_{hr}$ is the device layer thickness.

High temperature glue such as ceramic based glue can be used to assemble the indenter tip 3 onto the heated movable body 2. This makes it possible to heat the heatable movable body 2 with the indenter tip 3 to temperatures of several hundred degrees Celsius or even >1000° C. There are basically two limiting factors for the maximum temperature: The first one is that the diamond of the indenter tip 3 reacts with the carbon dioxide in the air and degrades. This can be avoided by performing the nanoindentation inside a vacuum or in a controlled atmosphere. The second limiting factor is the melting temperature of the silicon which lies at about 1414° C.

Figure 5:
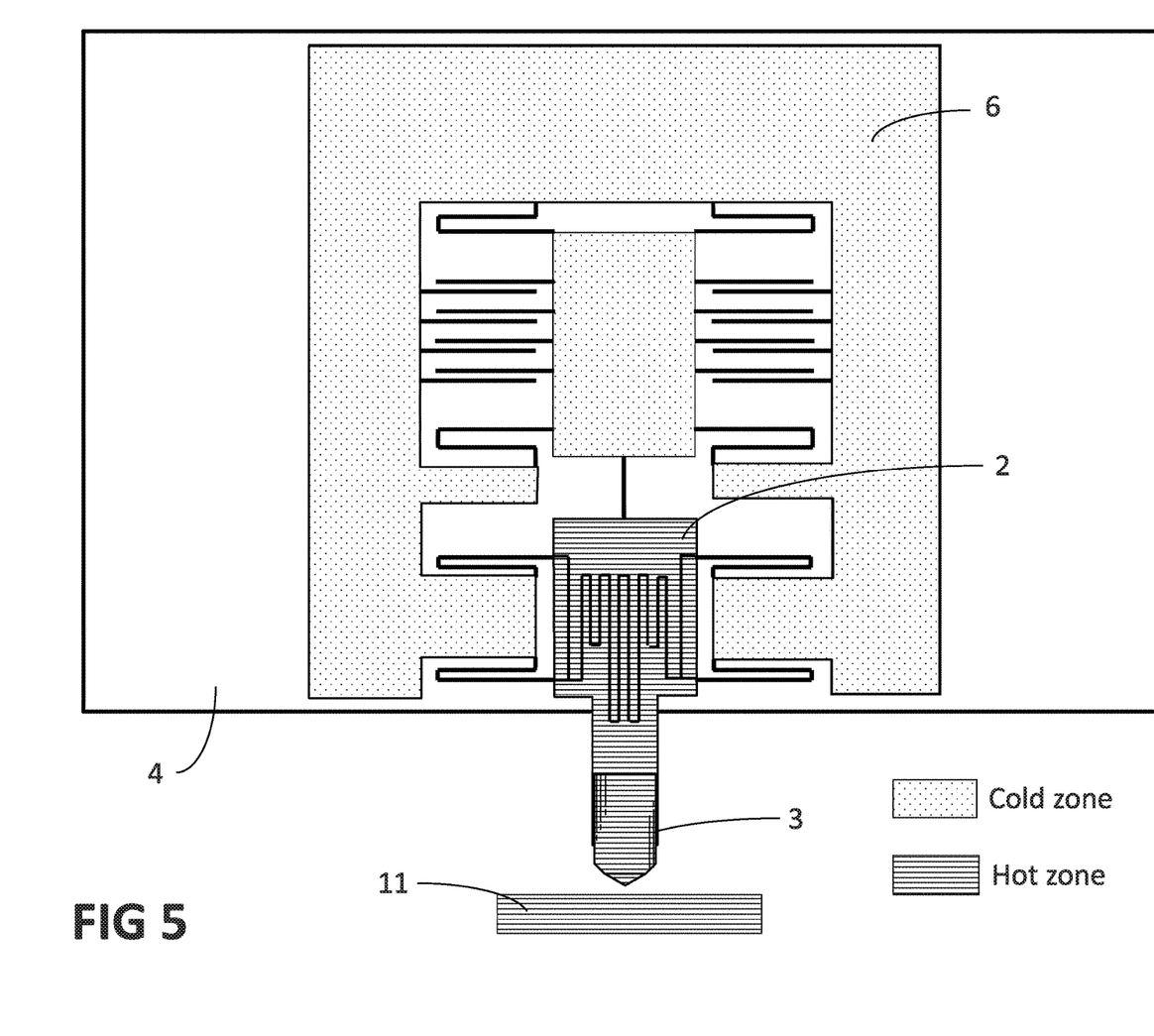
FIG. 5 is a vertical-sectional view of the MEMS microforce sensor showing thermal zones.

The MEMS microforce sensor 1 features a hot zone which includes the heated movable body 2, the heating resistor 12 and the indenter tip 3. The cold zone of the MEMS microforce sensor chip 1 includes the outer frame 6, the cold movable body 7 and the capacitor electrodes 10. It is desirable that the cold zone stays at a low temperature since heating up this region would create unwanted thermal drift in the capacitive force measurement. The hot zone and the cold zone are illustrated in FIG. 5.

The geometry of the heat sink flexures 5 and the bridge 8 influence the amount of heat that is transferred into the cold zone of the MEMS sensor chip 1. The bridge 8 mechanically connects the heated heatable body 2 and the cold movable body 7. The width $w_b$ of the bridge 8 is chosen to be narrow (e.g. 10 μm) and the length $l_b$ of the bridge 8 is chosen to be long (e.g. 200 μm) to reduce the amount of heat that is conducted through bridge 8. Similarly, the heat sink flexures 5 are constructed to be long and narrow to reduce the heat conduction into the cold zone of the MEMS microforce sensor chip 1.

The heat flow $P_{hf}$ that is transferred from the hot zone of the MEMS microforce sensor 1 into the cold zone of the MEMS microforce sensor 1 is given by:

$$P_{hf} = \Delta T \lambda (w_b t)/l_b + 4\Delta T \lambda (w_h t)/l_h,$$

wherein ΔT is the temperature difference between the cold zone and the hot zone of the MEMS microforce sensor 1 shown in FIG. 5, and λ is the temperature conductivity of the silicon of the device layer of the MEMS microforce sensor chip 1. Also, the equation above assumes that four identical heat sink flexures 5 are used. However, a different number of heat sink flexures 5 or different geometries for the heat sink flexures 5 may be used. In order to avoid unwanted buckling of the heat sink flexures 5 due to thermal expansion, a folded flexure construction may be used.

In a vacuum environment such as the chamber of a scanning electron microscope (SEM) the heat loss is dominated by heat conduction. Convection and radiation can be neglected. This means that if the heat power P is equal to $P_{hf}$, a steady state is achieved and ΔT stays constant. ΔT can be controlled by controlling I using the current source 17. Alternatively, a voltage source can also be used instead of a current source 17.

The heating resistor 12 is connected to the heatable movable body 2. The cold movable body 7 is connected to the outer frame 6 by a series of elastic flexures 9. The flexures are constructed in such a way that the cold movable body 7 is suspended and can deflect when a force is applied by the bridge 8. Similarly, the heatable movable body 7 is connected to the outer frame 6 by a series of heat sink flexures 5. The cold movable body 7 and the heatable movable body 2 are mechanically connected by at least one bridge 8. The capacitor electrodes 10 measure force by sensing the deflection of the cold movable body 7 relative to the outer frame 6 by a change of electrical capacitance. A differential comb drive configuration is used.

When a current is passed through the heating resistor 12, the temperature of the heatable movable body 2 is increased. The temperature of the heatable movable body 2 and the indenter tip 3 is the same since the indenter tip is glued directly onto the heatable movable body 2 using heat conducting high temperature glue. In order to keep the temperature of the cold movable body 7 as low as possible, the bridge is constructed in such a way that only a low amount of heat is conducted from the heatable movable body 2 into the cold movable body 7. Also, the heat sink flexures are constructed in such a way that a low amount of heat is conducted from the heatable movable body 2 into the outer frame 6.

From a thermal point of view, the MEMS microforce sensor 1 can be divided into two parts: A cold zone and a hot zone. The outer frame 6 and the cold movable body 7 together form the cold zone of the MEMS microforce sensor 1 and the heatable movable body 2 and the indenter tip 3 form the hot zone of the MEMS microforce sensor 1, as seen in FIG. 5. The wire bonds 18 are not only used for making electrical connections but also to increase the thermal coupling of the MEMS microforce sensor 1 to a large thermal mass 4 that acts as a heat sink. Additional wire-bonds and ground pads 14 may be used for increased heat dissipation.

Temperature Control:

As described above, current I can be used for controlling the temperature difference ΔT of the temperature difference between the cold zone and the hot zone of the MEMS microforce sensor chip 1. The goal is to achieve the same temperature for the sample 11 temperature $T_{sample}$ and the indenter tip 3 temperature $T_{tip}$ which is equal to the heatable body 2 temperature $T_{hb}$.

The cold zone of the MEMS microforce sensor chip 1 can easily be kept at a known and constant temperature by connecting it to a heat sink or a large thermal mass 4 such as e.g. the nanopositioning stage of the nanoindenter. This also means that the absolute tip temperature $T_{tip}$ of the indenter tip 3 can be controlled by using I. The temperature control can be open-loop. A temperature sensing capability is required for closed-loop temperature control of $T_{tip}$. There are different methods as to how to measure the temperature $T_{tip}$ of the indenter tip 3. Four of these methods are subsequently described:

Method 1:

The electrical resistance $R_{hr}$ of the heating resistor 12 is indirectly measured by monitoring both the voltage V and the current I that is applied to heater pads 15. The electrical resistance $R_{hr}$ changes with temperature and can therefore be used as a temperature sensor. However, it is noted that the relationship between $R_{hr}$ and $T_{tip}$ depends on the doping of the silicon and is non-linear.

Method 2:

The thermal expansion of the heatable movable body 2 will create a load deflecting the cold movable body 7. Therefore, the capacitor electrodes 10 connected with the cold movable body 7 and the outer frame 6 will sense this thermal expansion. This enables the closed-loop measurement of the indenter tip temperature $T_{tip}$ prior to the mechanical test. This method is not suitable though to measure the indenter tip temperature $T_{tip}$ when the indenter tip 3 is in contact with the sample 11. The reason is that the capacitive measurement cannot distinguish between a signal created by the indentation force F and the thermal expansion.

Method 3:

A second resistor dedicated for resistive temperature measurement is placed onto the heatable movable body 2. One way to realize this directly on the MEMS microforce sensor is to use a thin film metal deposition process (e.g. physical vapour deposition of a Platinum film) in combination with a lift-off process. Platinum is a popular material for temperature sensing since it does not oxidize at high temperatures and the temperature-resistance curve is well known. Alternatively, a resistor could be placed on the indenter tip 3 and electrically connected by flexible wires.

Method 4:

A thermal camera 21 or a pyrometer 20 with a sum-mm spot size is used for the contactless measurement of the temperature of the heatable movable body 2 and/or the indenter tip 3. A thermal camera can be used to directly measure the temperature of the sample 11, the heatable movable body 2 and/or the indenter tip 3 to detect a possible temperature mismatch or temperature gradient.

LIST OF REFERENCE NUMERALS

1 MEMS microforce sensor
2 heatable movable body
3 indenter tip
4 large thermal mass (heat sink)
5 heat sink flexures
6 outer frame
7 cold movable body
8 bridge
9 flexures
10 capacitor electrodes
11 sample
12 heating resistor (12)
13 sensor pads
14 grounding pads
15 heater pads
16 capacitive interface electronics
17 current source
18 wire-bonds
19 trench
20 pyrometer
21 thermal camera
PCB printed circuit board
SEM scanning electron microscope
SOI silicon on insulator
MEMS micro electromechanical system

REFERENCES

1. Wheeler et al., "High temperature nanoindentation: The state of the art and future challenges", Current Opinion in Solid State and Materials Science 19 (2015) 354-366
2. "Measuring head for nanoindentation instrument and measuring method using same", U.S. Pat. No. 7,685,868 B2
3. "A novel MEMS nano-tribometer for dynamic testing in-situ in SEM and TEM", A. V. Desai and M. A. Hague, Trib. Lett. 18, 13 (2005).
4. "A micromachined nanoidentation force sensor", A Nafari, A. Danilov, H. Rodjegard, P. Enoksson, and H. Olin, Sens. Actuator A 123-124,44 (2005)
5. "A bulk microfabricated multi-axis capacitive cellular force sensor using transverse comb drives", Y. Sun, B. J. Nelson, D. P. Potasek, E. Enikov, J. Micromech. Microeng. 12, 832 (2002).
6. "MEMS Nanoindenter", Enoksson et al., U.S. Pat. No. 7,654,159
7. "Micromachined Comb Drive for Quantitative Nanoindentation", Oh et al., U.S. Pat. No. 8,161,803 B2
8. "2-D MEMS tribometer with comb drives", Oh et al., US 2011/0265559 A1
9. "Actuable capacitive transducer for quantitative nanoindentation combined with transmission electron microscopy", Warren et al, US 20070180924A1
10. "Design and Interface of a Microfabricated Scanning Force Sensor for Combined Force and Position Sensing", Beyeler et al, U.S. Pat. No. 9,535,086 B2

REFERENCES

1 Wheeler et al., "High temperature nanoindentation: The state of the art and future challenges", Current Opinion in Solid State and Materials Science 19 (2015) 354-366
2. "Measuring head for nanoindentation instrument and measuring method using same", U.S. Pat. No. 7,685,868 B2
3. "A novel MEMS nano-tribometer for dynamic testing in-situ in SEM and TEM", A. V. Desai and M. A. Hague, Trib. Lett. 18, 13 (2005).
4. "A micromachined nanoidentation force sensor", A Nafari, A. Danilov, H. Rodjegard, P. Enoksson, and H. Olin, Sens. Actuator A 123-124,44 (2005)
5. "A bulk microfabricated multi-axis capacitive cellular force sensor using transverse comb drives", Y. Sun, B. J. Nelson, D. P. Potasek, E. Enikov, J. Micromech. Microeng. 12, 832 (2002).
6. "MEMS Nanoindenter", Enoksson et al., U.S. Pat. No. 7,654,159
7. "Micromachined Comb Drive for Quantitative Nanoindentation", Oh et al., U.S. Pat. No. 8,161,803 B2
8. "2-D MEMS tribometer with comb drives", Oh et al., US 2011/0265559 A1
9. "Actuable capacitive transducer for quantitative nanoindentation combined with transmission electron microscopy", Warren et al, US 20070180924A1
10. "Design and Interface of a Microfabricated Scanning Force Sensor for Combined Force and Position Sensing", Beyeler et al, U.S. Pat. No. 9,535,086 B2

The invention claimed is:

1. A MEMS microforce sensor for determining a mechanical property of a sample by sensing a deflection and measuring a force, the MEMS microforce sensor comprising:
an outer frame;
a cold movable body;
a heatable movable body;
a series of heat sink flexures connecting said heatable movable body to said outer frame;
a series of flexures connecting said cold movable body to said outer frame;
at least one bridge mechanically interconnecting said cold movable body and said heatable movable body;
a heating resistor connected to said heatable movable body; and
capacitor electrodes measuring a force applied on the sample by sensing a deflection of said cold movable body relative to said outer frame by a change of electrical capacitance.

2. The MEMS microforce sensor according to claim 1, wherein said heatable movable body experiences an increase in temperature due to a current passing through said heating resistor.

3. The MEMS microforce sensor according to claim 1, which further comprises an indenter tip glued to the MEMS microforce sensor.

4. The MEMS microforce sensor according to claim 3, wherein said outer frame and said cold movable body together form a cold zone of the MEMS microforce sensor, and said heatable movable body and said indenter tip form a hot zone of the MEMS microforce sensor.

5. The MEMS microforce sensor according to claim 3, which further comprises a resistor located on said heatable movable body or on said indenter tip for measuring a temperature of said heatable movable body.

6. The MEMS microforce sensor according to claim 1, wherein said capacitor electrodes form a differential capacitive comb drive.

7. The MEMS microforce sensor according to claim 1, wherein said bridge is configured to mechanically connect said heatable movable body and said cold movable body while reducing heat being transferred from said heatable movable body into said cold movable body.

8. The MEMS microforce sensor according to claim 1, wherein said heat sink flexures are configured to suspend said heatable movable body while reducing heat being transferred from said heatable movable body into said outer frame.

9. The MEMS microforce sensor according to claim 1, wherein a temperature of said heatable movable body is measured by an electrical resistance of said heating resistor.

10. The MEMS microforce sensor according to claim 1, wherein a temperature of said heatable movable body is measured as a change of electrical capacitance by said capacitor electrodes.

11. The MEMS microforce sensor according to claim 1, which further comprises a contactless thermal camera or a pyrometer for measuring a temperature of said heatable movable body.

* * * * *